No. 763,421. Patented June 28, 1904.

UNITED STATES PATENT OFFICE.

FREDERICK AUGUSTA PANK, OF BUTTE, MONTANA.

ACID-PROOF COMPOSITION.

SPECIFICATION forming part of Letters Patent No. 763,421, dated June 28, 1904.

Application filed September 9, 1903. Serial No. 172,493. (No specimens.)

*To all whom it may concern:*

Be it known that I, FREDERICK AUGUSTA PANK, a subject of the King of Great Britain, and a resident of Butte, in the county of Silverbow and State of Montana, have invented a new and useful Acid-Proof Composition to be Used for Coating Iron Pipes, of which the following is a full, clear, and exact description.

My invention relates to a composition of matter, the same being a kind of waterproof and acid-proof paint.

This composition or paint when applied to iron pipes used in the copper-mining industry will prevent the corrosion of such pipes by the acids normally contained in the copper water. It has heretofore been necessary to line such pipes with wood; but the expensive and cumbersome lining of wood may be dispensed with if the pipes have been properly coated with my composition. My composition admits of general use, however, and is by no means limited in its application to pipes of this kind, being suitable for use in building, marine, naval, and other construction work, and to prevent corrosion of iron and steel generally.

The composition is made as follows: First, I take one gallon of boiled linseed-oil, applying heat thereto and, stirring the oil constantly, I add and dissolve eight ounces of india-rubber therein; second, I dissolve four ounces of resin; third, I dissolve ten ounces of finely-cut beeswax; fourth, I add three pounds of powdered silica; fifth, I dissolve two pounds of red lead; sixth, I add three pounds of powdered gypsum. The mixture is maintained all the while just at the boiling-point and is constantly stirred. The fourth and fifth steps may be consolidated by adding the silica and red lead at the same time; but I find that the results are more satisfactory if they are added separately.

More satisfactory results are obtained if the composition be applied while hot.

Having thus described my invention, I claim as new and desire to secure by Letters Patent—

1. The herein-described composition of matter, consisting of linseed-oil, india-rubber, resin, beeswax, silica, red lead, and gypsum.

2. The herein-described composition of matter, comprising substances in the following proportions, to wit: one gallon linseed-oil, eight ounces india-rubber, four ounces resin, ten ounces beeswax, three pounds silica, two pounds red lead, and three pounds of gypsum.

In testimony whereof I have signed my name to this specification in the presence of two subscribing witnesses.

FREDERICK AUGUSTA PANK.

Witnesses:
  WILLIAM F. DAVIS,
  LEWIS J. DUNCAN.